United States Patent
McMillen

(10) Patent No.: US 9,239,749 B2
(45) Date of Patent: Jan. 19, 2016

(54) NETWORK FAULT DETECTION AND RECONFIGURATION

(71) Applicant: ParAccel, Inc., Campbell, CA (US)

(72) Inventor: Robert J. McMillen, Carlsbad, CA (US)

(73) Assignee: ParAccel LLC, Campbell, CA (US)

( * ) Notice: Subject to any disclaimer, the term of this patent is extended or adjusted under 35 U.S.C. 154(b) by 496 days.

(21) Appl. No.: 13/789,503

(22) Filed: Mar. 7, 2013

(65) Prior Publication Data

US 2013/0297976 A1    Nov. 7, 2013

Related U.S. Application Data

(60) Provisional application No. 61/643,140, filed on May 4, 2012.

(51) Int. Cl.
| | |
|---|---|
| G06F 11/00 | (2006.01) |
| G06F 11/07 | (2006.01) |
| H04L 12/26 | (2006.01) |
| H04L 12/24 | (2006.01) |

(52) U.S. Cl.
CPC .......... *G06F 11/079* (2013.01); *H04L 41/0645* (2013.01); *H04L 41/0659* (2013.01); *H04L 43/10* (2013.01)

(58) Field of Classification Search
CPC ....... G06F 11/079; H04L 45/28; H04L 43/10; H04L 41/0677
See application file for complete search history.

(56) References Cited

U.S. PATENT DOCUMENTS

| | | | |
|---|---|---|---|
| 5,231,813 A | 8/1993 | Drawdy | |
| 6,173,411 B1 * | 1/2001 | Hirst | H04L 12/2697 709/223 |
| 7,808,919 B2 * | 10/2010 | Nadeau | H04L 43/026 370/248 |
| 7,937,492 B1 * | 5/2011 | Kompella et al. | H04L 45/22 370/351 |
| 8,165,745 B2 * | 4/2012 | Sakurai | B60W 50/0205 370/229 |
| 8,169,922 B2 * | 5/2012 | Qian | H04L 41/0631 370/245 |
| 8,737,419 B2 * | 5/2014 | Itano | H04L 12/44 370/431 |
| 2004/0205377 A1 * | 10/2004 | Nakamura | G06F 11/1494 714/4.5 |
| 2004/0255185 A1 * | 12/2004 | Fujiyama | G06F 11/1482 714/4.1 |

(Continued)

OTHER PUBLICATIONS

Davis, T., et al., "Linux Ethernet Bonding Driver HOWTO," Nov. 12, 2007, 29 Pages, [online] [retrieved on Oct. 4, 2013], Retrieved from the internet <http://iweb.dl.sourceforge.net/project/bonding/Documentation/12%20November%202007/bonding.txt>.

*Primary Examiner* — Loan L. T. Truong
(74) *Attorney, Agent, or Firm* — Fenwick & West LLP

(57) ABSTRACT

Scalable means are provided for diagnosing the health of a parallel system comprising multiple nodes interconnected using one or more switching networks. The node pings other nodes via different paths at regular intervals. If more than a threshold number of pings are missed from a node, the system performs fault detection by entering a freeze state in which nodes do not send or receive any messages except ping messages. If ping messages still fail to reach destination nodes, the parallel system identifies faulty components that are causing ping messages to fail. Once the faulty component is identified, the parallel system is unfrozen by allowing nodes to communicate all messages. If redundant computers and/or switches are present, the parallel system is automatically reconfigured to avoid the faulty components.

20 Claims, 7 Drawing Sheets

(56) References Cited

U.S. PATENT DOCUMENTS

| | | | |
|---|---|---|---|
| 2006/0034181 A1* | 2/2006 | Noguchi | H04L 1/22 370/242 |
| 2006/0126495 A1* | 6/2006 | Guichard | H04L 12/2697 370/216 |
| 2007/0118911 A1* | 5/2007 | De Gaetano | G06F 21/105 726/30 |
| 2007/0153676 A1* | 7/2007 | Baglin | H04W 24/04 370/216 |
| 2007/0220059 A1* | 9/2007 | Lu | G06F 17/30368 1/1 |
| 2010/0023632 A1* | 1/2010 | Liu | H04L 12/4633 709/230 |
| 2011/0032260 A1* | 2/2011 | Duggan | G06F 3/0484 345/440 |
| 2011/0068906 A1* | 3/2011 | Shafer | G06K 7/0008 340/10.3 |
| 2011/0090788 A1* | 4/2011 | Hicks, III | G06F 11/2005 370/228 |
| 2011/0238817 A1* | 9/2011 | Okita | H04L 43/0817 709/224 |
| 2012/0039165 A1* | 2/2012 | Brown | G06F 11/2017 370/220 |
| 2012/0120949 A1* | 5/2012 | Raghuraman | H04L 45/04 370/389 |
| 2013/0262937 A1* | 10/2013 | Sridharan | G06F 11/0709 714/47.2 |
| 2013/0286859 A1* | 10/2013 | Wei | H04L 43/0823 370/244 |

* cited by examiner

NETWORK FAULT DETECTION AND RECONFIGURATION

CROSS REFERENCES TO RELATED APPLICATIONS

This application claims the benefit of U.S. Provisional Patent Application 61/643,140, entitled "Network Fault Detection and Reconfiguration," filed on May 4, 2012, which is incorporated by reference in its entirety.

FIELD OF ART

The disclosure generally relates to detection of network faults in parallel or distributed systems and reconfiguration of the system to keep the system running despite faults.

BACKGROUND

Enterprise systems typically utilize multiple processors connected via network to increase efficiency as well as reliability. Efficiency of execution is improved by utilizing multiple processors to perform a computation in parallel. Reliability is improved by ensuring that the service performed by the enterprise is not interrupted in spite of failures. A failure can occur in a processor or in the communication infrastructure. A large distributed system that employs a large number of processors and a complex communication infrastructure is likely to encounter more failures in a given period compared to a smaller system since the larger system has more components that can fail. Enterprises often use distributed systems to provide services that can cause significant losses to the enterprise if interrupted. An enterprise that sells products or services online, for example, an online bookseller or an online reservation system can lose large amount of revenue if the online service is down for a long time.

Furthermore, distributed systems for certain businesses need to be designed so that there is no loss of data when failure occurs. For example, the system may continuously receive requests and updates from users. However, the system is not expected to lose any of the requests or updates in spite of failures. Loss of data can cause liability for enterprises or significant effort in either restoring the information or resolving issues with customers related to lost data. For example, if a customer places an order and the information regarding the order is lost, the enterprise needs to resolve the customer issue which may require live operators. Typically, the expense of resolving an issue using live operators is much higher than the cost of transactions executed automatically. Besides, loss of information may affect the reputation of the enterprise and resulting in loss of customer goodwill.

Enterprises rely on hardware solutions, for example, fault tolerant switching hardware. These solutions require the enterprise to design their architecture around specialized hardware and make it difficult for the enterprise to switch to a different vendor of hardware if they need to. Several enterprises utilize solutions that require a technician to debug the problem and isolate the faulty component. Manual determination of faults can be a tedious, slow, and expensive process. Furthermore, solutions utilized by certain enterprises require the system to be restarted. Requiring the system to be restarted results in the system being unavailable until the restart operation completes. Furthermore, requiring a restart of the system is likely to cause loss of requests from the customers and therefore loss of information.

SUMMARY

Embodiments of the invention relate to detecting network faults in a parallel system by freezing communications in the system to ensure that diagnostic ping messages reach their destination unless there are faulty components in the system. The parallel system comprises nodes connected to each other by links A communication module sends ping messages to one or more destination nodes and waits for acknowledgements from the destination nodes. If the communication module does not receive an acknowledgement message, the communication module infers that the ping message failed to reach the destination node. Accordingly, a fault detection system determines whether there is a faulty component or the acknowledgement or the ping message was lost for some other reason, for example, slow performance of the parallel system. To determine faulty components, the fault detection system freezes communications of the parallel system by requesting nodes to stop sending or receiving messages other than ping messages. The fault detection system, detects faulty components in the system by attempting to send ping messages through various paths. The fault detection system determines a component to be faulty based on failure to send messages through the component. After detecting the fault, the fault detection system unfreezes the system by requesting the nodes to resume communication of messages other than ping messages.

In an embodiment, the parallel system reconfigures the system to allow the nodes to communicate without using the faulty components of the system. Each node stores structures describing the network configuration for communicating with other nodes. The structures describing the network configuration are modified to reflect a new network configuration that excludes the faulty components. The system is reconfigured to communicate without using the faulty components by using the new network configuration.

In an embodiment, the parallel system executes a hierarchical state machine to determine the faulty component. The state machine includes link state machines that track the links of the parallel system, node state machines that track the nodes of the parallel system and switch state machines that track the switches of the parallel system. The state of the switch state machine is determined based on states of the links of the switch. The state of the node state machine is determined based on states of the links connected to the node. In an embodiment, a link is identified as the faulty component if the link fails to deliver a sequence of messages. A node is identified as the faulty component if all links connected to the node are identified as faulty.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments allow fault detection in parallel or distributed processing systems in which two or more computers are interconnected using one or more switching networks. A computer or a processing unit of a parallel or distributed system is referred to herein as a node. Embodiments provide a scalable mechanism allows diagnosing the health of the network by detecting faults. The scalable mechanism automatically reconfigures the system if redundant computers and/or switches are available. A parallel system herein refers to any system that comprises multiple processing units or nodes that interact with each other using an interconnection network to process tasks, for example, a distributed database system or a multi-processor parallel system.

Embodiments perform fault detection and reconfiguration without using any fault detection features provided in the hardware of the switch. For example, certain types of switches provided by different manufacturers support fault detection mechanisms implemented in the switch hardware. However, there is no standard enforced across different vendors regarding this type of support. Therefore a system that utilizes these features is typically tied to the particular vendor. This makes it difficult to switch to a different vendor for any reason. Therefore, embodiments avoid using any specific feature supported by any hardware component for detecting faults and reconfiguring. As a result, techniques discussed herein can be applied to any system independent of any specific hardware fault detection capabilities provided by the hardware used.

Furthermore, embodiments cause minimal disruption to computations in progress at the time of the failure. For example, the system does not have to be restarted in case faults occur as the system is reconfigured. The system keeps functioning while the components of the system get reconfigured to work around a fault. For example, if the parallel system implements a parallel database system that is processing database queries when a fault occurs, the system does not require these database queries to be restarted once the system is reconfigured to overcome faults.

System Environment

Figure 1A:
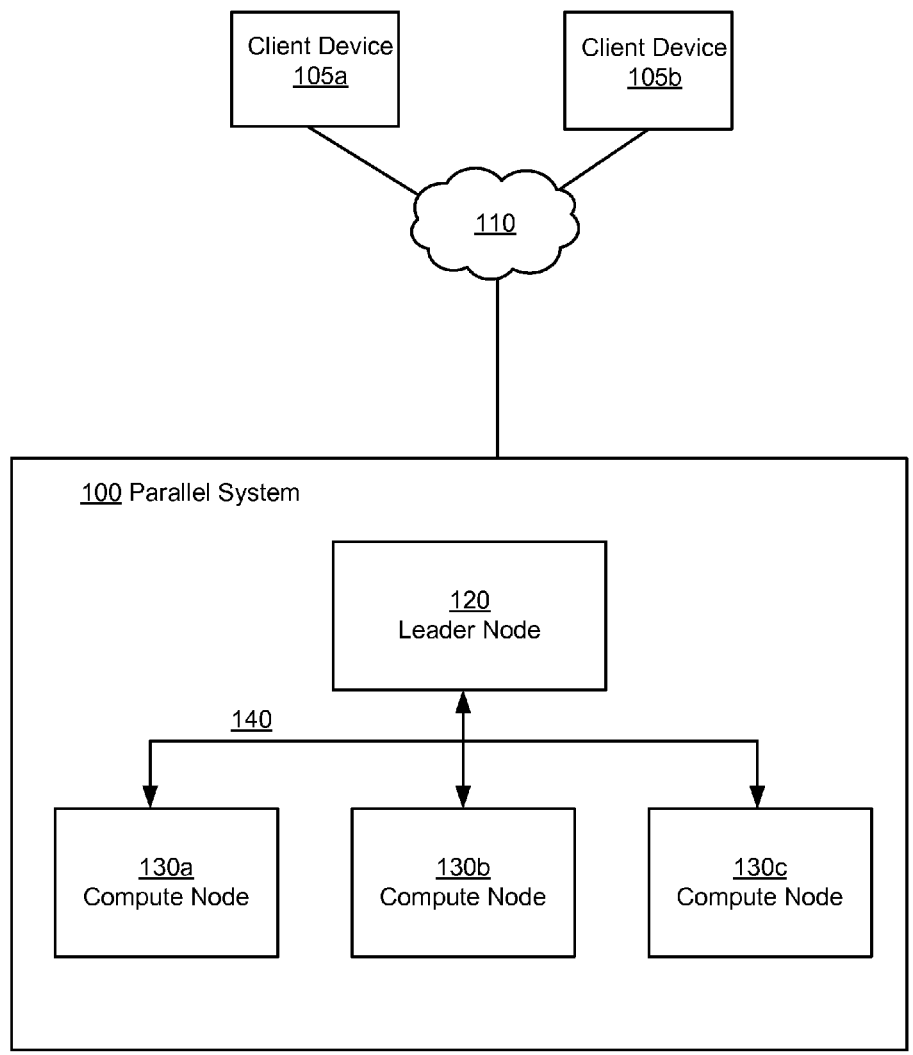
FIG. 1(a) shows the architecture of an example parallel system, in accordance with an embodiment of the invention.
Figure 1B:
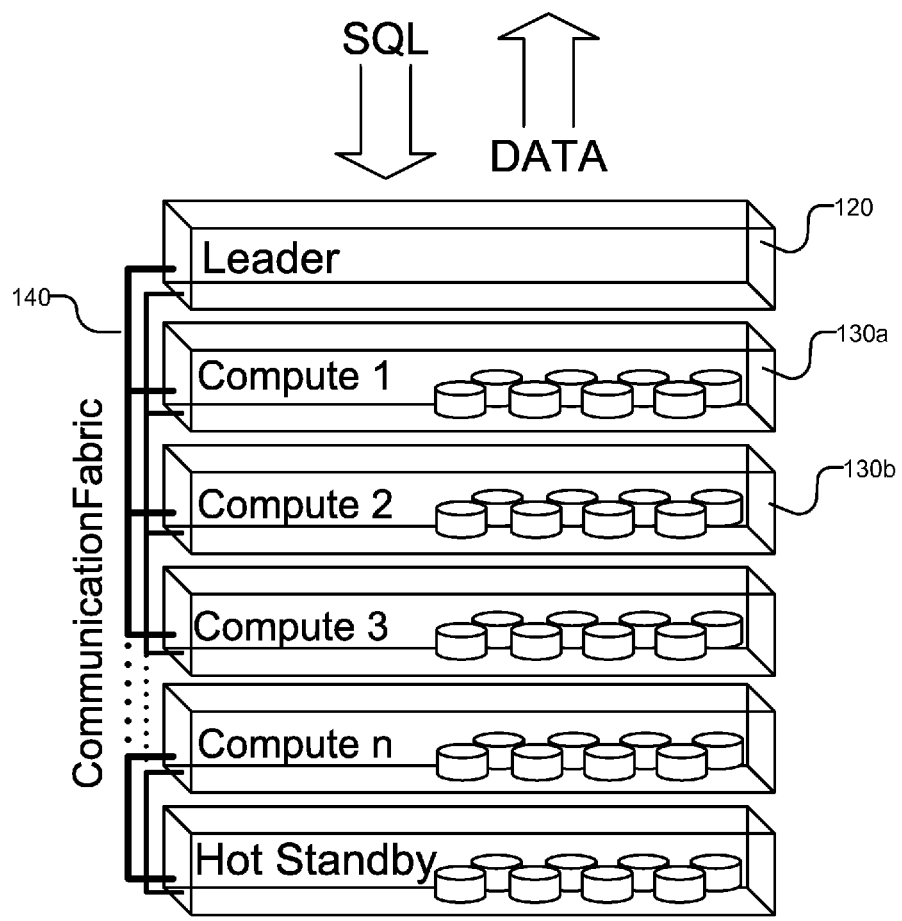
FIG. 1(b) show the architecture of an example parallel system, in accordance with another embodiment of the invention.

FIG. 1 shows the overall system environment illustrating the architecture of a parallel system, in accordance with an embodiment of the invention. An example of a parallel system 100 is a parallel database system configured to execute database queries. Although several concepts disclosed herein are described with reference to a parallel database system, embodiments can be applied to any other parallel or distributed system. For example, embodiments can perform fault detection and reconfiguration for a multi-processor system used for performing numerical computations, image processing, computer vision processing, and the like. The description herein refers to the parallel system 100 as system 100 interchangeably.

The parallel system 100 shown in FIG. 1 comprises a leader node 120, one or more compute nodes 130, and a parallel communication fabric 140. The leader node is also referred to herein as the leader. A letter after a reference numeral, such as "130a," indicates that the text refers specifically to the element having that particular reference numeral, while a reference numeral in the text without a following letter, such as "130," refers to any or all of the elements in the figures bearing that reference numeral.

The leader node 120 controls the execution of the compute nodes, and all nodes communicate with each other via the communication fabric 140. The leader node 120 may be on a network and allows interfacing with external applications and the rest of the systems on a network. The leader and compute nodes can be standard x86 servers running Linux. Users and applications may communicate with the parallel system 100 via the leader by using standard interfaces. For example, if the system 100 implements a parallel database system, applications may communicate with the leader node via ODBC or JDBC.

In an embodiment, a leader node 120 manages communication with the compute nodes 130. In a parallel database system, the leader is responsible for controlling sessions, parsing and optimizing queries, and scheduling execution of the workload. The leader may or may not participate in data operations. Architectural workload separation by node type (leader and compute nodes) allows for better throughput optimization. The leader's bandwidth is optimized for outward communication and handling of query overhead so each compute node's bandwidth is dedicated to data operations. The parallel system 100 may include multiple leader nodes to avoid a single point of failure. In an embodiment, one or more compute nodes act as leader nodes.

Compute nodes 130 are processing units responsible for processing and storing data. In a parallel database system, each node stores and manages a subset of the rows of each table. For example, if a table has 1 billion rows and there are 20 compute nodes, then approximately 50 million rows may be distributed to each node. Data may be distributed to a particular node based on a hashing algorithm applied to a distribution key, or by round robin. Distribution keys, such as the primary key or other popular join column, may be used for even distribution of data. By offering multiple methods of data distribution, it is possible to maintain the appropriate balance between data distribution and performance so a parallel system can take best advantage of its resources and provide good parallel efficiency. The parallel system performance may be driven by how many compute nodes are present as well as the parallelism available in a given task. For example, with a highly parallel processing application, a 50-compute node system may perform 5× faster than a 10-compute node system.

In an embodiment, the communication fabric 140 is a high performance fabric based on standard, ubiquitous, Gigabit Ethernet (GbE) and standard multi-port switches that have full crossbar support. The communication fabric 140 may use a custom protocol to enable highly efficient communication among each of the nodes (leader and compute). The communication fabric 140 may be specifically designed for packet traffic in a complex, parallel database environment thereby delivering maximum interconnect performance. For example, communication fabric 140 may efficiently move large intermediate result sets, redistribute data, and so on. In an embodiment, the communication fabric 140 uses multiple links simultaneously running multiple data streams. The communication fabric 140 may be implemented internally as multiple independent networks all working on behalf of the database. Some embodiments use two GbE fabrics for high availability. Other embodiments may utilize as many communication fabrics 140 as are available for increased performance.

Client devices 105 are computing devices that execute client software, e.g., a web browser or built-in client application, to interact with the parallel system 100 via a network 110. The terms "client" or "client device," as used herein may refer to software providing respective functionality, to hardware on which the software executes, or to the entities operating the software and/or hardware, as is apparent from the context in which the terms are used. In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smart phone, etc.

The interactions between the client devices 105 and the system 100 are typically performed via a network 110, for example, via the internet. The network 110 enables communications between the client device 105 and the system 100. In one embodiment, the network 110 uses standard communications technologies and/or protocols. In another embodiment, the entities can use custom and/or dedicated data communications technologies instead of, or in addition to, the ones described above. Depending upon the embodiment, the network 110 can also include links to other networks such as the Internet.

System Architecture

Figure 2:
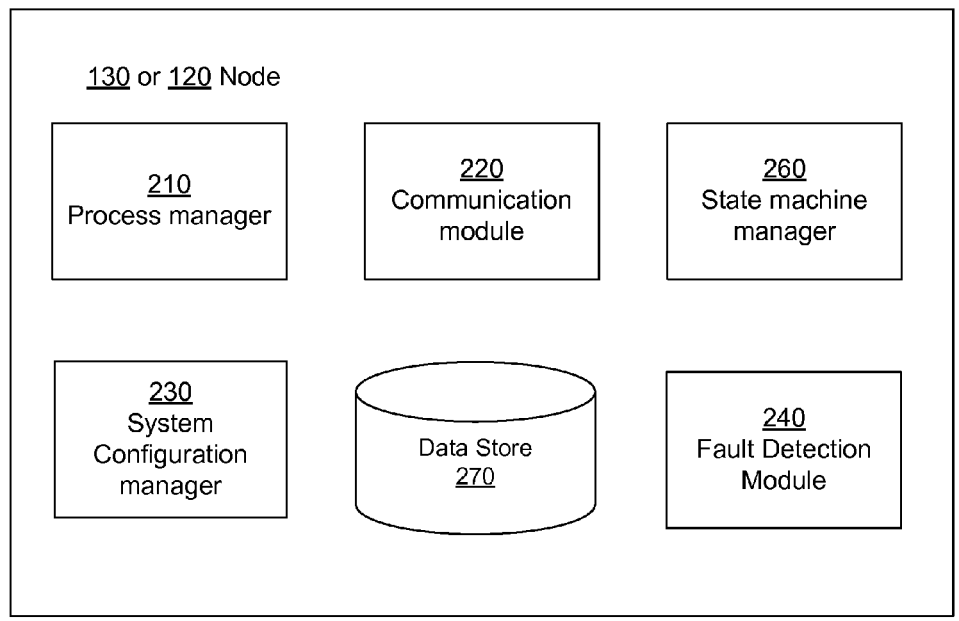
FIG. 2 is a high level block diagram illustrating the system architecture of a node of the parallel system, for example the leader node and the compute nodes, in accordance with an embodiment.

FIG. 2 is a high level block diagram illustrating the system architecture of a node of the parallel system 100, for example the leader node and the compute nodes, in accordance with an embodiment. The node 120 or 130 comprises a process manager 210, a communication module 220, a state machine manager 260, a system configuration manager 230 and a data store 270. In alternative configurations, different and/or additional modules can be included in the system. Furthermore, some of the components may occur only in the leader node, some only in compute node and some on both leader node and compute nodes.

The process manager 210 manages the various processes on a node, for example, the communication processes, the processes that send ping messages etc. The communication module 220 coordinates communication between nodes and manages the communication protocols. For example, if the recipient of a message does not send an acknowledge message the communication module 220 may send the message again after a delay to make sure that the target node receives the message. The fault detection module 240 performs the overall process to detect faults in the system 100. The state machine manager 260 executes the state machines to determine the states of various links, switches, nodes, and/or the overall system. The system configuration manager 230 helps with tasks including reconfiguration of the networks to work around faulty nodes. The data store 270 stores any application related information, for example, if the parallel system 100 is running a database, the data store may store database information for example, various tables.

Overall Process

If the fault detection module 240 detects a fault, the communication module 230 freezes the system state by stopping all communications via the interconnection network. The fault detection module 240 then takes steps to identify the fault. After the fault detection module 240 identifies the fault, the system configuration manager 230 takes actions to allow the system to function despite the faults, for example, by reconfiguring the system to work around the fault. Subsequently, the communication module 230 thaws the system 100 or unfreezes the system, i.e., the system resumes the communications so the system can function as normal.

In an embodiment, the communication module 230 freezes the system by instructing all nodes to stop communicating with each other and stop processing network packets except for diagnostic messages. The nodes stop communicating by refusing to receive any messages and also not sending any messages that they need to send. A node that receives a message can drop the message so long as it does not acknowledge receipt of the message since the sender will be forced to retry sending the message in the absence of an acknowledgement.

Freezing the system helps ensure that diagnostic messages can get through. In other words, freezing the system minimizes delays to diagnostic messages caused by regular operation of the system. The delays of diagnostic messages in a frozen system are more predictable, and undue delays can be reliably assumed to be caused by faults rather than slow system response.

Even though, when the system is frozen and nodes stop processing packets, the system stores the information describing the available packets to ensure that no packets are missed. The communication module 220 enforces the communication protocols of the system to ensure that each packet gets retransmitted until the recipient sends an acknowledgement message indicating that the recipient successfully received the message. Accordingly, when the system is unfrozen, the communication protocols ensure that all messages are successfully delivered and there is no loss of messages being transmitted.

The process of freezing the system allows the system to distinguish between actual network faults from long delays in messages. For example, it is possible that ping messages sent by the leader node 120 are missing mainly because of system load resulting in slow performance. In other words, long delays may be interpreted as lost messages which in turn may be interpreted as fault of a communication link or switch. Freezing the system ensures that all diagnostic messages are delivered without undue delays. If pings from leader nodes are being lost in spite of the system being frozen, the system assumes that there is a high likelihood that there is a network fault in the system.

If there are multiple links to a particular node and pings to the node via at least one link are successful, the fault detection module 240 concludes that the node is functioning properly and any loss of pings is caused by a link failure and not node failure. In this situation, the system configuration manager 230 reconfigures the parallel system 100 so that the nodes use a switch other than the switch with the faulty link, so that the faulty switch may be fixed. In contrast, if ping messages through every link to the node are failing, the fault detection module 240 concludes that the node has failed rather than links to the node. In this situation, the system configuration manager 230 reconfigures the parallel system 100 so as to avoid using the faulty node. For example, the system 100 may use another node to perform the function of the node determined as failed, assuming the system is configured with enough redundant nodes. In an embodiment, the software of the parallel system 100 is reconfigured so that the new configuration avoids the failed components and the parallel system 100 continues to function using the new configuration.

Embodiments utilize a multilevel hierarchy of modular, heterogeneous state machines. This approach enables efficient scaling of resources in multiple dimensions while keeping the processing very light weight, minimizing overhead. So long as there is enough redundant hardware such that each node can communicate with other nodes in case of link/switch failures and there are enough redundant nodes to take over the work load of faulty nodes in case of node failures, the system can continue functioning.

The advantages of the embodiments disclosed are as follows. All available switches can be used actively, providing greater bandwidth in fault free conditions. Switches are treated like black boxes, so any commodity switch can be used. As a result, there is no dependence on any feature provided by a particular switch manufacturer or on a specific model. Single switches with virtual private networks can be supported. The monitoring mechanism is very light weight, minimizing overhead. The monitoring mechanism is highly scalable and works with any number of computers and switches. The monitoring mechanism is tolerant of slow or unreliable switches and heavily loaded computers, which minimizes false alarms. Embodiments can distinguish among a large number of different fault situations enabling precise control over how each should be handled.

The parallel system 100 may incorporate two or more switches so there is at least one functional switch available in case of failures, thereby increasing fault tolerance. Embodiments can perform fault detection on different types of architectures for parallel or distributed processing systems. However, a particular architecture is described for sake of illustration. The example architecture disclosed includes a leader node 120 and one or more compute nodes 130, interconnected by one or more switching networks. All nodes have equal access to each other via each network. The leader node 120 is responsible for external communication and orchestrating the work of the compute nodes. In a given implementation, one computer may host both leader node functionality and compute node functionality without any loss of generality.

In an embodiment, the leader node 120 pings all compute nodes 130 via every available path at regular intervals. Since the hardware is not being monitored directly, failure has to be inferred by an absence of pings. However, missed pings may not automatically imply failed hardware. Heavy traffic in the network can cause packets to be dropped. Furthermore, compute nodes that become disk I/O bound, for example, may starve communication processes (e.g., simcomm or diagpingsvr processes described herein) for compute cycles and cause non-responsiveness even though the hardware is fault free. Finally, a compute node may fail and become non-responsive on all links. Consequently, correct diagnosis of a system with hundreds to thousands of compute nodes and multiple networks (e.g., 4 or 8) requires a significant degree of sophistication in the algorithm that interprets ping responses.

In an embodiment, the leader node 120 tolerates a preconfigured rate of misses of pings which may occur if the network load is high. However, if the rate at which pings are missed exceeds a threshold value, the leader node 120 initiates the above process of determining whether there is an actual fault and if so, determining where the fault is and to reconfigure the system to continue functioning in spite of the fault.

Figure 3:
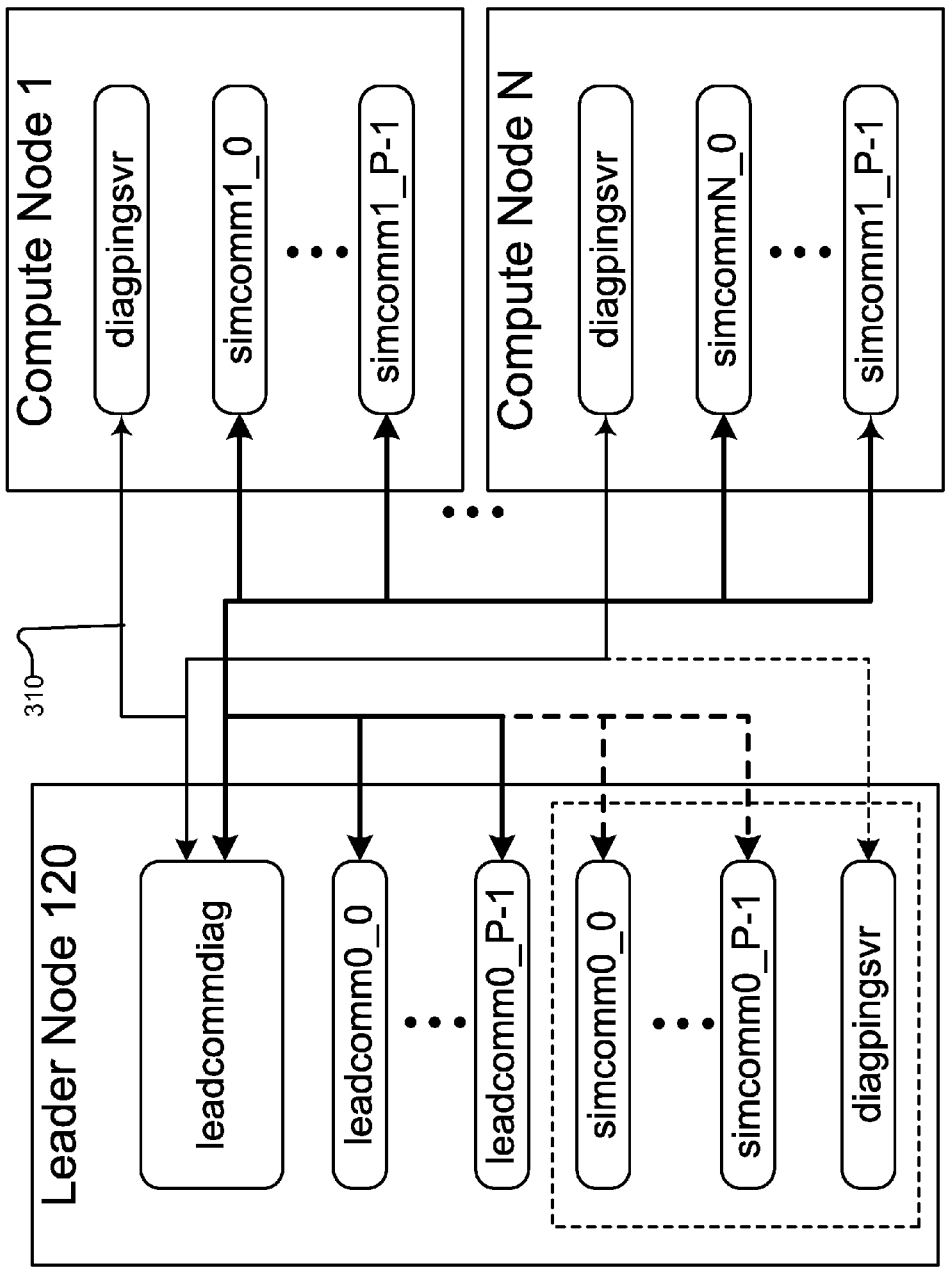
FIG. 3 shows the processes running in the different types of nodes of the parallel system shown in FIG. 1, in accordance with an embodiment.

FIG. 3 shows the processes running in the different types of nodes of the parallel system 100, in accordance with an embodiment. The switching networks are not shown explicitly. They are implied by the arrowed lines 310 interconnecting the processes. The lines 310 indicate which processes communicate with each other. Processes in dashed lines indicate those processes that would be present if a leader node and a compute node are collocated on the same physical computer.

One or more leadcomm processes handle primary control and data communication for the leader node. Multiple processes can be used to speed up communication processing, especially when the hosting CPU (central processing unit) contains multiple compute cores. One or more simcomm processes on each compute node handle all primary data communication for the node. The number of simcomm (or leadcomm) processes on a node may be a multiple of the number of links connected to the node (which in turn may be same as the number of switches in the system or less than the number of switches in the system.)

In some embodiments, the number of links per node can be more than the number of physical switches in the system, for example, configurations with switches using VLANs (virtual local area networks). If there are multiple simcomm or leadcomm processes on a node, the task of processing the incoming data on the link is divided between these processes. For fault diagnosis purposes, the leader node has an independent leadcommdiag process that monitors the health of all networks present. To facilitate that, each compute node has a diagpingsvr process that listens for pings from the leadcommdiag process and respond on the same link to which the incoming ping originated. Typically the diagpingsvr process is a light weight process that does not perform any other task than listen to ping messages and acknowledge them.

The leadcommdiag process has the ability to communicate with every simcomm and leadcomm process in the system for facilitating diagnosis when a fault is suspected and reconfiguration when a fault is diagnosed. If a leader node and compute node are not co-located, there is no need for a diagpingsvr to be instantiated on the leader node. In the event of a reconfiguration, the leadcommdiag process must be able to communicate with the leadcomm processes, however.

State Machine Diagnosing Faults

Figure 4:
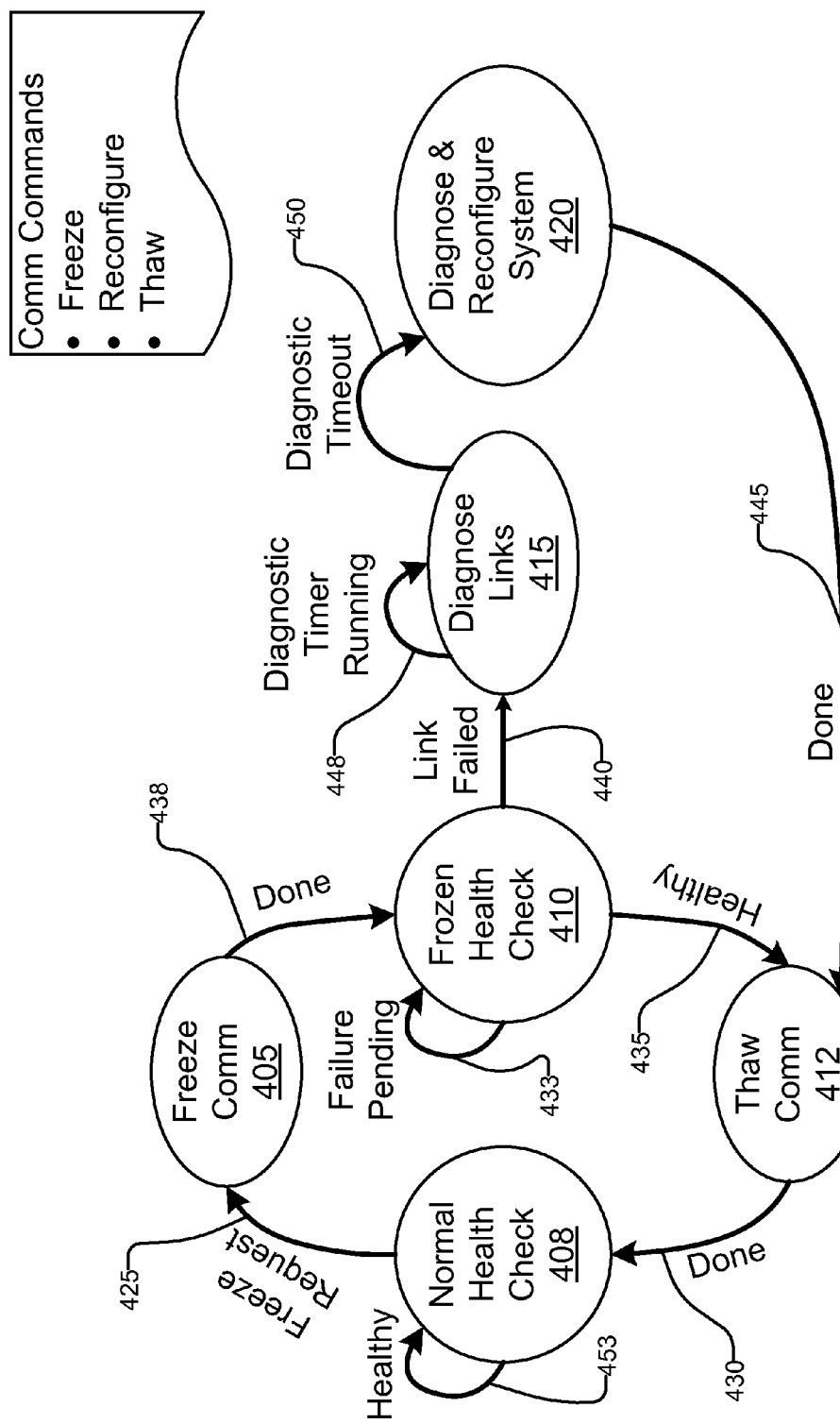
FIG. 4 illustrates an overall state machine for diagnosing faults in a parallel system and reconfiguring the parallel system to keep the system running in spite of the fault, in accordance with an embodiment.

FIG. 4 illustrates an overall state machine for diagnosing faults in a parallel system and reconfiguring the parallel system to keep the system running in spite of the fault, in accordance with an embodiment. The state transitions based on the state machine are performed by the state machine manager 260. For example, the various components including the process manager 210, system configuration manager 230, and so on check with the state machine to determine the next action to be taken. In some embodiments, the state machine manager 260 sends requests to different modules of the system 100 based on the state transitions of the state machine to invoke specific actions of the modules.

The system 100 during normal operation stays in the normal health check state 408. In the normal health check state 408, the system 100 functions normally and keeps performing the regular health check operations. If the system 100 determines that all links in the system are healthy, the system stays 453 in the normal health check state 408. If the system determines that at least one link state machine is sending a freeze request to freeze the system, the system transitions 425 to the freeze comm state 405.

In the freeze comm state 405, the system performs actions to freeze the system by stopping all communications except diagnostic ping messages. When the leader node sends signals to all nodes to freeze by stopping sending/receiving all communications, the system gets frozen and the system state is transitioned 438 from freeze comm 405 to frozen health check state 410. In the frozen health check state, the system is frozen but can perform health check since diagnostic messages can still go through. The system stays 433 in the frozen health check state 410 while the system is checking for faults and if there are any failures detected. If no failures are detected, i.e., all links are found to be healthy, the system transitions 435 from frozen health check 410 state to thaw comm state 412.

In the thaw comm state 412, the system takes appropriate actions to start the normal functioning of the system. In the thaw comm state 412 the leader node sends messages to the communication processes on the nodes to thaw the system, i.e., resume normal communications. When all nodes resume normal communications and the system is thawed, the system transitions 430 from the thaw comm state 412 to normal health check state 408. If in the frozen health check state 410, the system detects a failed link, the system transitions 440 to the diagnose links state 415. In this state, the system identifies the overall state of the system and which links have failed.

The system stays in the diagnose links state 415 while the diagnostic timer is running If the system reaches the diagnostic timeout, i.e., the diagnostic timer has run for a predetermined amount of time waiting to hear from various components if there are any faulty links or the links are healthy, the system transitions 450 from the diagnose links state 415 to the diagnose and reconfigure system state 420 in which the leader node sends instructions to the various nodes to reconfigure their communications to work around the faults identified in the system. Once the system completes the reconfiguration, the system transitions 445 from the diagnose and reconfigure system state 420 to the thaw comm state 412, thereby allowing the system to thaw and resume normal operations.

Structure of Hierarchical State Maching

Figure 5:
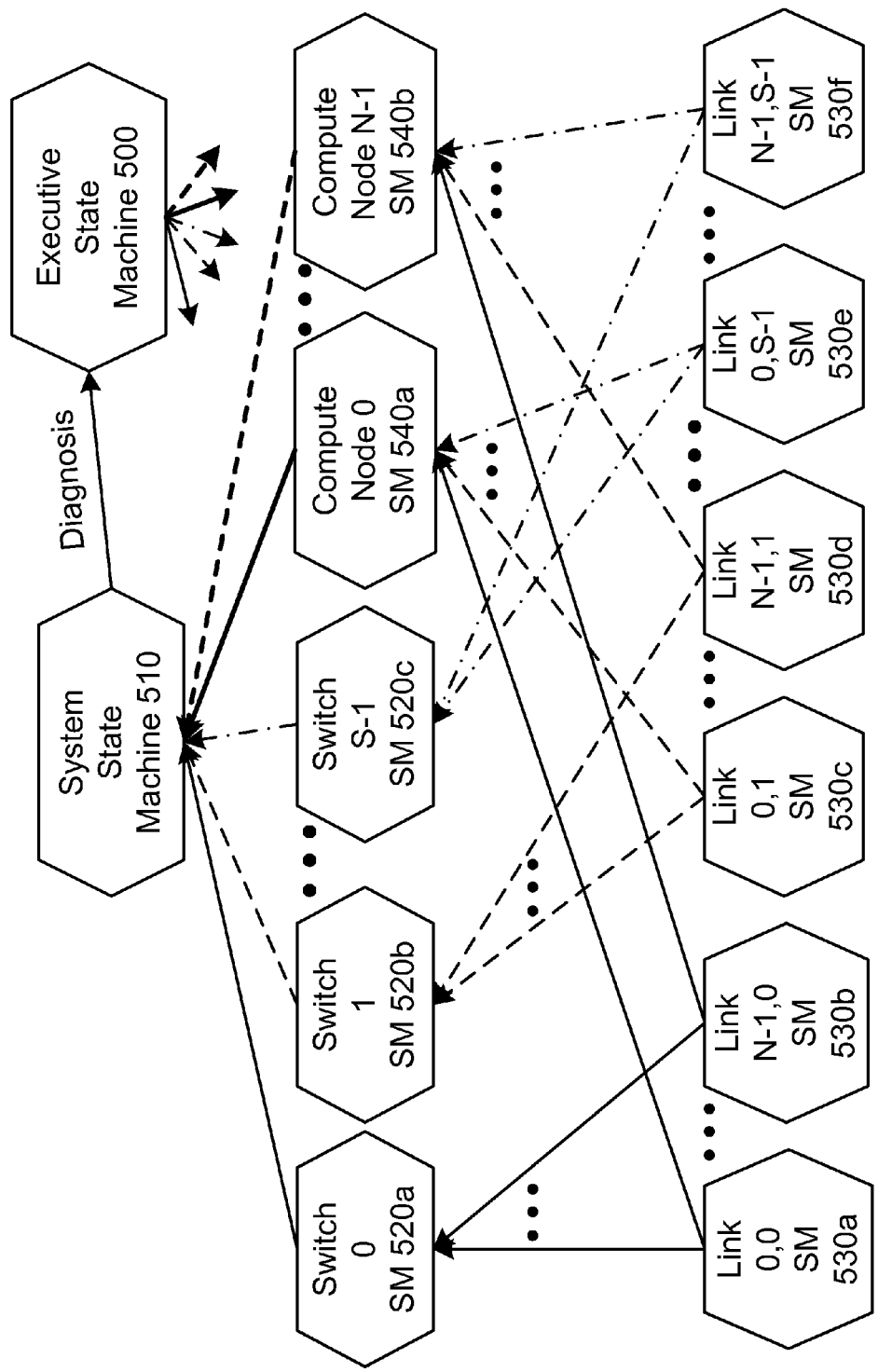
FIG. 5 illustrates a hierarchical state machine for monitoring and detecting faults in a parallel system, in accordance with an embodiment.

FIG. 5 illustrates a hierarchical state machine for monitoring and detecting faults in a parallel system, in accordance with an embodiment. If there are S switches in the parallel system, each switch having N links, there are S×N (where S×N denotes the product of S and N) links total in the system (across all switches). For example, if there are 4 switches, each switch having 10 links, there is a total of 4×10=40 links in the system.

The state machine manager 260 maintains one link state machine corresponding to each link. Accordingly, there are S×N link state machines maintained in the system. The following description assumes that the state machines are maintained by the state machine manager 260 executing in the leader node but in various embodiments, any node (for example, a compute node) can execute the state machine manager 260 to perform the task of maintaining the state machines. Note that a failure of the node that maintains all the state machines may result in the system not being able to perform the processes described herein to recover from faults. In an embodiment, one or more backup nodes may be assigned to perform the task of maintaining the state machines in case of the failure of the node assigned for this task.

FIG. 5 shows S×N link state machines 530 corresponding to links (i,j) where 0<=i<N and 0<=j<S, i.e., i takes values from 0 to N−1 and j takes values from 0 to S−1. A state machine may be referred to as SM. The link (i,j) corresponds to switch i connected to node j. FIG. 5 shows S switch state machines 520, i.e., the switch state machine j, where 0<=j<S, i.e., j takes values from 0 to S−1. FIG. 5 shows N compute node state machines 540, i.e., the compute node state machine i, where 0<=i<N, i.e., i takes values from 0 to N−1. Each switch state machine receives input from state machines of all the links that are on that switch. Accordingly, the state of the switch state machine is determined by the state of the links of the switch. Similarly a compute node state machine gets input from each link that is connected to the compute node. Accordingly, the state of the compute node state machine is determined by the state of the links connected to the compute node. Each compute node has a link from each switch connected to it.

In some embodiments, not all compute nodes are connected to links from each link state machine. Each compute node may be connected to links from a subset of switches. However, in order to achieve fault tolerance, a compute node should be connected to at least two links so that if one of the links fails, the other link can be used to communicate with the compute node. The principles disclosed herein apply to a configuration where each node is symmetric with respect to other nodes as well as a configuration where nodes may be asymmetric.

FIG. 5 also shows a system state machine that receives input from all the switch state machines 520 and the compute node state machines 540. Accordingly, the state of the system state machine is determined based on the state of each switch and the state of each compute node. The system state machine 510 determines the overall faults of the system, for example, which links might be faulty, or which switches might be faulty, or which compute nodes might be faulty. For example, the system state machine 510 may indicate that a particular link (say link 5 of switch 3) has failed or a particular node (say node 12) has failed. Alternatively, the system state machine 510 may determine that there is no failure in the system. The system state machine 510 enables the leader node to initiate the correct process to reconfigure the system to work around the faults.

The system state machine 510 causes the diagnosis of the system to be provided to the executive state machine 500 which in turn performs the actions required to reconfigure the system appropriately to enable the system to continue functioning in spite of the faults. The executive state machine 500 also updates the states of various other machines, for example, when the system is reconfigured, the states of the switch state machines and node state machines may be updated. In an embodiment, all state machines are executing on the leader node, for example as part of the leadcommdiag processes executing on the leader node.

Link State Machine

Figure 6:
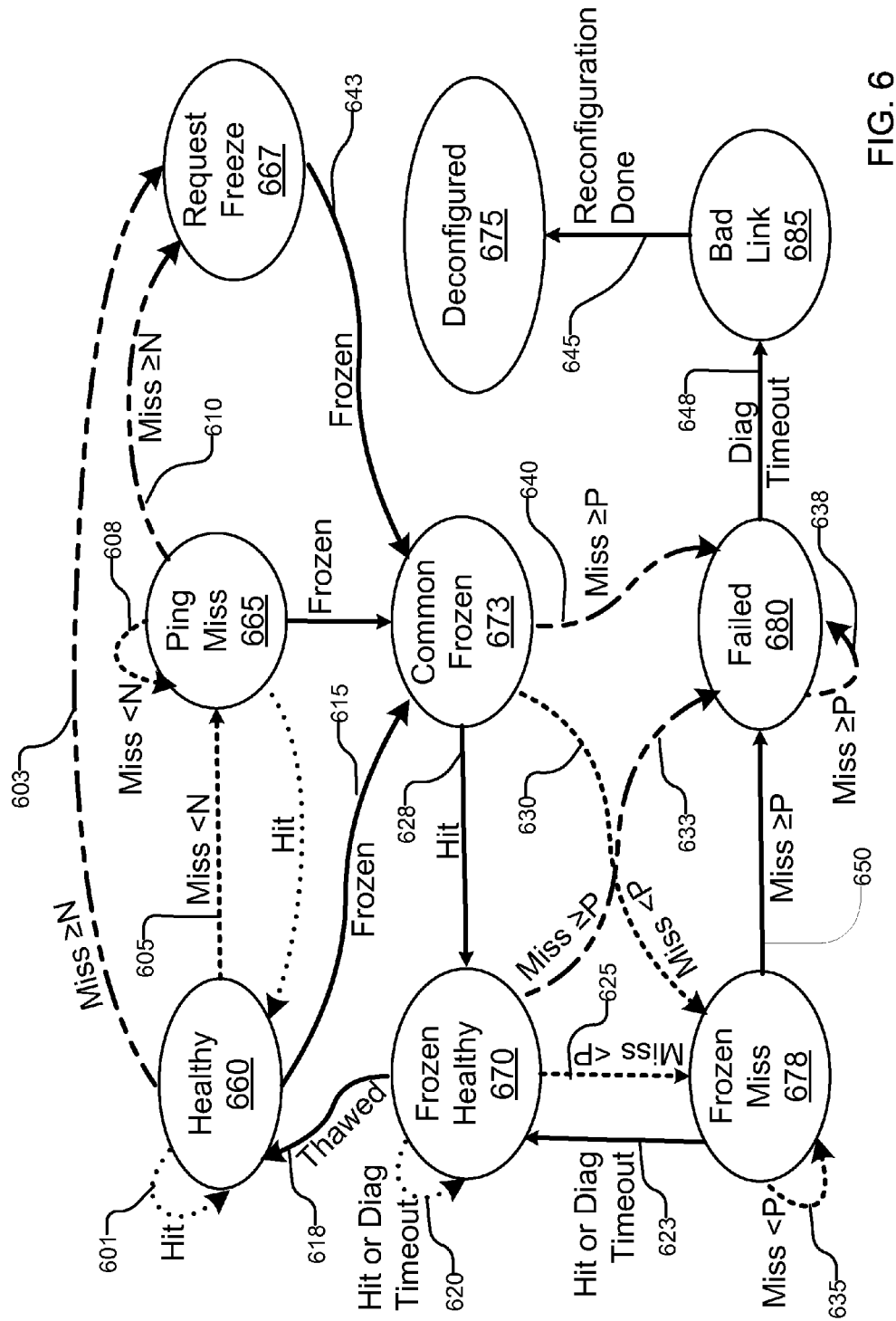
FIG. 6 illustrates a link state machine for determining faults with specific links, in accordance with an embodiment.

FIG. 6 illustrates a link state machine for determining faults with specific links, in accordance with an embodiment. In an embodiment, the state machine manager 260 executes the link state machine and sends requests to appropriate modules to perform actions in response to state transitions. If all links are working normally, all links are considered to be in the "Healthy" state. In an embodiment, the executive state machine 500 initializes all links state machines to the "Healthy" state 660. The executive state machine 500 ensures that a ping message is sent via each link periodically, for example, every second.

If a ping message is successfully delivered as indicated by an acknowledgement message sent by the recipient, the ping message is considered a hit. If the ping message is not successfully delivered via the link, the ping message is considered a miss. In an embodiment, the leader node sends the ping message and waits for a particular time interval to decide whether it receives an acknowledgement back or not. If it receives the acknowledgement back within the threshold time period, the ping message is determined to be a hit or else the ping message is determined to be a miss.

If the ping message is a hit, the link state machine stays in the healthy state as indicated by the arrow 601. If there are less than N misses in a row as indicated by arrow 605 the link state changes to "ping miss" 665. N is a predetermined threshold value, also called a healthy miss count indicating that up to N misses are considered healthy for the link. If a system is expected to be very busy, the value of N, i.e., healthy miss count may have to be large since the nodes may be busy with computations and may take a long time to respond to ping messages.

Since the overhead of detecting a fault by freezing the system can be very high, the system is typically configured so as to avoid going through the whole process of detecting faults due to false signals. If there are more ping misses in a row in state 665, the link state machine stays 608 in the state 665 i.e., the ping miss state. However if the streak of misses is broken by a ping hit, the link state machine transitions 612 to the healthy state 660. This is so because the system never received more that N misses in a row due to the break in the streak. As a result the state machine manager 260 determined the system to be healthy. The state machine manager 260 also resets the count of misses in a row for the link to zero.

However, if the number of misses in the state 665 exceeds the value of N, the link state transitions 610 to request freeze state 667. If value of N is one, the link state will transition 603 directly from healthy state 660 to request freeze state 667. Once the link state machine reaches a "request freeze" state 667, the link state machine stays in this state until a system freeze occurs.

Once the executive state machine 500 determines that there is a "request freeze" state in a link, the executive state machine 500 causes the communication of all nodes to freeze. The leader node waits for all nodes to confirm that they have frozen their communication. A compute node may receive request to freeze from multiple links, but may respond only once to the leader node when it freezes all communication of the node. When a node is frozen it stops sending any messages and also ignores any incoming messages except messages sent for diagnostic purposes.

Once the leader node determines that the communication processes of all nodes are frozen, the executive state machine causes the link state machines to transition 643 to "comm frozen" state 673. Note that when the system is frozen, the executive state machine may cause other link state machines that may have been in healthy state 660 to transition 615 to "comm frozen" state 673.

When all links state machines are in "comm frozen" state 673, the leader node sends ping messages to give a chance to all nodes to respond. In this situation, since all communications are frozen, it is unlikely that a ping message would be missed in spite of no fault. Note that the faulty links if any may be few and the majority of links may be healthy. All healthy links transition 628 from "comm frozen" state 673 to frozen healthy state 670 upon receiving a ping hit. If a link does have a fault, it results in a ping miss and transitions 630 from "comm frozen" state 673 to frozen miss state 678. Similarly, a link that is in the frozen healthy state 670 may also transition 625 to the frozen miss state if it causes less than P misses in a row.

Note that P is another threshold number that must be exceeded by the number of misses in a row by a link to be considered a faulty link. Typically P is a value smaller than N since the system is in a frozen state and the messages have a higher likelihood of being delivered if there are no faults, e.g., P can be 2 or 3. A link in frozen miss state 678 stays 635 in the frozen miss state 678 if it keeps resulting in misses in a row so long as the number of misses is less than P. However, if a link in a frozen miss state 678 results in a ping hit (before it experiences P or more misses in a row), the link is transitioned 623 to the frozen healthy state. Similarly, a link that is in a frozen healthy state 670 stays 620 in the frozen healthy state if it experiences ping hits.

If a link experiences P or more ping misses in the frozen miss state 678, the link state is transitioned 650 to a failed state 680. If the value of P is one, the link state may transition 633 from frozen healthy state 670 to the failed state 680 with a single ping miss. Similarly, if the value of P is one, the link state may transition 640 from the comm frozen state 673 to the failed state 680 with a single ping miss.

Once a link reaches a failed state 680, and the executive state machine completes looking for faults (after a diagnostic time out), the link state is transitioned 648 to the bad link state 685. If a link stays in the frozen miss state 678 and there are less than P misses in a row experienced by the link during the diagnostic time out during which the executive state machine investigates faults, the link state machine may be transitioned 623 to frozen healthy state 670. This indicates that the link never experienced P or more ping misses during the diagnostic time out period, i.e., the period during which the executive state machine looks for faults in links and is considered healthy. Similarly, a link in frozen healthy state 670 stays in frozen healthy state 670 if diagnostic time out occurs.

In general, the system assumes that if any link receives a ping hit before it reaches a streak of more than a threshold number of ping misses, the link is considered healthy and its counter of ping misses is reset to zero. The link must receive another unbroken streak of more than threshold number of ping misses before the link is considered faulty. A link that is in a failed state 680 stays 638 in the failed state if it results in more ping misses after it reaches the threshold of P ping misses.

At the end of diagnostic time out, the leader node determines the states of all switches and nodes by propagating the link states up in the hierarchy illustrated in FIG. 5. If all links end up in the frozen healthy state 670 at the end of the diagnostic timeout, then the executive machine (or the leader node) determines that there are no faults. However, if at least one link end up in the bad link state 685, the executive machine determines that there is a fault in the system and it needs to take corrective actions by reconfiguring the system to eliminate the faulty link.

When the reconfiguration is completed, the link in the bad link state 685 is transitioned 645 to the deconfigured state 675. All links that are in frozen healthy state 670 are transitioned 618 to the healthy state 660 after the system is thawed or unfrozen. The executive state machine 500 thaws the system by sending a message to each node that is not faulty to begin sending and receiving messages of the application that is executing on the parallel system.

In an embodiment, the state machine manager 260 executing on the leader node maintains the states of all links in a two dimensional array, such that the $(i,j)^{th}$ element of the two dimensional array keeps track of the state of the $(i, j)^{th}$ link. In other embodiments, the state of the links may be stored in a one dimensional array of size S×N elements such that the $(i,j)^{th}$ link state is mapped to a unique element of the one dimensional array.

The leader node determines the state of each switch as shown in FIG. 5 based on the states of all links of the switch. For example, if all links of the switch are healthy, the switch is considered healthy. If one or more links of the switch are determined to be faulty, the switch state conveys that information. Accordingly, the state of a switch indicates whether it has no faulty links, one faulty link, or multiple faulty links.

Similarly, the state of each node is determined based on the state of all links at that node. If all the links arriving at the node are determined to be faulty, the node is determined to be faulty. If at least one link at the node is not faulty, the node is determined to be healthy and the information regarding which links at the node are faulty may be conveyed in the node state. Accordingly, the node state indicates whether all links of the node are healthy, or all links of the node are faulty or less than all links of the node are faulty.

Once the states of all switches and nodes are determined, these states are fed into the system state machine to determine the overall state of the system. The system state indicates all the faults in the system. In an embodiment, the various possible states of the system are: (1) Some switches each have a bad single link; if only one switch, the system has the option to fail the node. (2) All switches of the system have a bad single link. (3) The system has a single node failure, i.e., all switches have the same bad link. (4) The system has some bad switches, each with multiple link failure (5) The system has some bad switches with mix of single/multiple link failure (6) All switches of the system are bad with mix of single/multiple link failure (7) The system has a single switch and single node failure. (8) The system has all bad switches. (9) The system has multiple node failure.

The state information about the system is provided to the executive state machine to allow the executive state machine 500 to decide the actions to be taken to reconfigure the system to work around the faulty components. The executive machine communicates with all the communication processes on all nodes with instructions indicating how the system needs to be reconfigured to work around the detected faults. A communication processor of each node receives the instructions and decides how to change the data structures at the node to reconfigure the node to communicate based on the new configuration. The reconfigured nodes communicate so as to avoid all faulty components, for example, bad links, bad switches, or bad nodes.

In an embodiment, each node stores data structures that reflect the communication topology of the system. These structures are changed to reflect a new configuration that excludes the faulty components. The system gets reconfigured as the system uses the modified data structures. The reconfiguration of the system does not require a restart of the system and is performed dynamically as the system continues to function.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method for detecting communication faults in a parallel system, the method comprising:
    sending ping messages by a node of the parallel system to one or more destination nodes, wherein the parallel system comprises a plurality of nodes communicating with each other using a plurality of links, each node comprising a processor;
    waiting to receive acknowledgements from each destination node indicating the destination node received the ping message;
    responsive to failure to receive one or more acknowledgement message, detecting failure of corresponding one or more ping messages to reach their destination nodes; and
    responsive to detecting failure of one or more ping messages to reach their target nodes, identifying faulty component in the parallel system, the identifying comprising:
        freezing communications in the parallel system by sending a request to nodes of the system to stop sending and receiving messages except for ping messages;
        sending ping messages through different components of the parallel system;
        identifying the faulty component based on failure to deliver a ping message through the component; and
        unfreezing the parallel system by sending requests to the nodes of the system to restart sending and receiving messages other than ping messages.

2. The computer-implemented method of claim 1, wherein the faulty component is one of a link, a node, or a switch.

3. The computer-implemented method of claim 1, wherein identifying the faulty component comprises:
    identifying a link as the faulty component responsive to the link failing to communicate a sequence of ping messages.

4. The computer-implemented method of claim 1, wherein identifying the faulty component comprises:
   identifying a node as the faulty component responsive to all links connected to the node being determined to be faulty.

5. The computer-implemented method of claim 1, wherein each link is associated with a switch and identifying the faulty component comprises:
   identifying a switch as the faulty component responsive to any links of the switch being determined as faulty.

6. The computer-implemented method of claim 1, detecting failure of a ping message comprises determining a failure to receive more than a threshold number of acknowledgements corresponding to ping messages sent.

7. The computer-implemented method of claim 1, wherein identifying the faulty components in the system comprises executing a hierarchical state machine comprising:
   link state machines that track states of links of the parallel system;
   switch state machines that track states of the switches of the parallel system; and
   node state machines that track states of nodes of the parallel system.

8. The computer-implemented method of claim 7, wherein a state of each switch state machine is determined based on states of the link state machines tracking states of the links of the switch.

9. The computer-implemented method of claim 7, wherein a state of each node state machine is determined based on states of the link state machines tracking states of the links connected to the node.

10. The computer-implemented method of claim 7, further comprising a system state machine, wherein the state of the system state machine is determined based on the states of the switch state machines and node state machines of the system.

11. The computer-implemented method of claim 1, further comprising:
   reconfiguring the system to allow the nodes to communicate without using the faulty component of the system.

12. The computer-implemented method of claim 11, wherein each node stores structures describing a network configuration for communicating with other nodes and reconfiguring the system to communicate without using the faulty components comprises modifying the structures describing the network configuration to reflect a new network configuration that excludes the faulty components.

13. A computer-readable storage medium storing computer-executable code for detecting communication faults in a parallel system, the code, when executed by a processor, causing the processor to:
   send ping messages by a node of the parallel system to one or more destination nodes, wherein the parallel system comprises a plurality of nodes communicating with each other using a plurality of links, each node comprising a processor;
   wait to receive acknowledgements from each destination node indicating the destination node received a ping message;
   responsive to failure to receive one or more acknowledgement message, detect failure of corresponding one or more ping messages to reach their destination nodes; and
   responsive to detecting failure of one or more ping messages to reach their target nodes, identify faulty component in the parallel system, the identifying causing the processor to:
      freeze communications in the parallel system by sending a request to nodes of the system to stop sending and receiving messages except for ping messages;
      send ping messages through different components of the parallel system;
      identify the faulty component based on failure to deliver a ping message through the component; and
      unfreeze the parallel system by sending requests to the nodes of the system to restart sending and receiving messages other than ping messages.

14. The computer-readable storage medium of claim 13, wherein the code causes a processor to execute a hierarchical state machine comprising:
   link state machines that track states of links of the parallel system;
   switch state machines that track states of the switches of the parallel system; and
   node state machines that track states of nodes of the parallel system.

15. The computer-readable storage medium of claim 14, wherein the code causes the processor to:
   determine a state of each switch state machine based on states of the link state machines tracking states of the links of the switch.

16. The computer-readable storage medium of claim 14, wherein the code causes the processor to:
   determine a state of each node state machine based on states of the link state machines tracking states of the links connected to the node.

17. A computer-implemented system for detecting communication faults in a parallel system, the system comprising:
   a computer processor; and
   a computer-readable storage medium storing computer program modules configured to execute on the computer processor, the computer program modules comprising:
      a communication module configured to:
         send ping messages by a node of the parallel system to one or more destination nodes, wherein the parallel system comprises a plurality of nodes communicating with each other using a plurality of links, each node comprising a processor;
         wait to receive acknowledgements from each destination node indicating the destination node received a ping message;
      a fault detection module configured to:
         responsive to failure to receive one or more acknowledgement message, detect failure of corresponding one or more ping messages to reach their destination nodes; and
         responsive to detecting failure of one or more ping messages to reach their target nodes, identify faulty component in the parallel system, the identifying causing the processor to:
            freeze communications in the parallel system by sending a request to nodes of the system to stop sending and receiving messages except for ping messages;
            send ping messages through different components of the parallel system;
            identify the faulty component based on failure to deliver a ping message through the component; and
            unfreeze the parallel system by sending requests to the nodes of the system to restart sending and receiving messages other than ping messages.

18. The computer-readable storage medium of claim 17, wherein the computer program modules comprise a state machine manager configured to execute a hierarchical state machine comprising:
   link state machines that track states of links of the parallel system;
   switch state machines that track states of the switches of the parallel system; and
   node state machines that track states of nodes of the parallel system.

19. The computer-readable storage medium of claim 18, wherein the state machine manager is configured to:
   determine a state of each switch state machine based on states of the link state machines tracking states of the links of the switch.

20. The computer-readable storage medium of claim 18, wherein the state machine manager is configured to:
   determine a state of each node state machine based on states of the link state machines tracking states of the links connected to the node.

* * * * *